United States Patent [19]

Kutsay

[11] 4,364,280
[45] * Dec. 21, 1982

[54] DOUBLE SHEAR BEAM STRAIN GAGE LOAD CELL

[76] Inventor: Ali U. Kutsay, 12 Union Hill Rd., West Conshohocken, Pa. 19428

[*] Notice: The portion of the term of this patent subsequent to Aug. 18, 1998, has been disclaimed.

[21] Appl. No.: 223,865

[22] Filed: Jan. 9, 1981

Related U.S. Application Data

[63] Continuation of Ser. No. 37,231, May 8, 1979, Pat. No. 4,283,941.

[51] Int. Cl.³ .............................................. G01L 1/22
[52] U.S. Cl. .............................................. 73/862.66
[58] Field of Search ................................... 73/862.66

[56] References Cited

U.S. PATENT DOCUMENTS

| | | | |
|---|---|---|---|
| 3,196,676 | 7/1965 | Pien | 73/862.66 |
| 3,365,689 | 1/1968 | Kutsay | 73/862.67 X |
| 3,513,431 | 5/1970 | Kovacs | 73/862.66 X |
| 3,943,761 | 3/1976 | Schoberg et al. | 73/862.66 X |
| 3,969,935 | 7/1976 | Shuberg | 73/862.66 |
| 4,283,941 | 8/1981 | Kutsay | 73/862.66 |

FOREIGN PATENT DOCUMENTS

| | | | |
|---|---|---|---|
| 2631698 | 7/1977 | Fed. Rep. of Germany | 73/862.66 |
| 52-15380 | 2/1977 | Japan | 73/862.66 |

*Primary Examiner*—Charles A. Ruehl
*Attorney, Agent, or Firm*—Eugene E. Geoffrey, Jr.

[57] ABSTRACT

A double shear beam strain gage load cell having an essentially U-shaped structure with a movable element disposed therebetween, the movable element being coupled to the legs of the U-shaped structure by a pair of shear beams carrying strain gages. The load cell may also include overload protective means to prevent damage to the shear beams.

1 Claim, 9 Drawing Figures

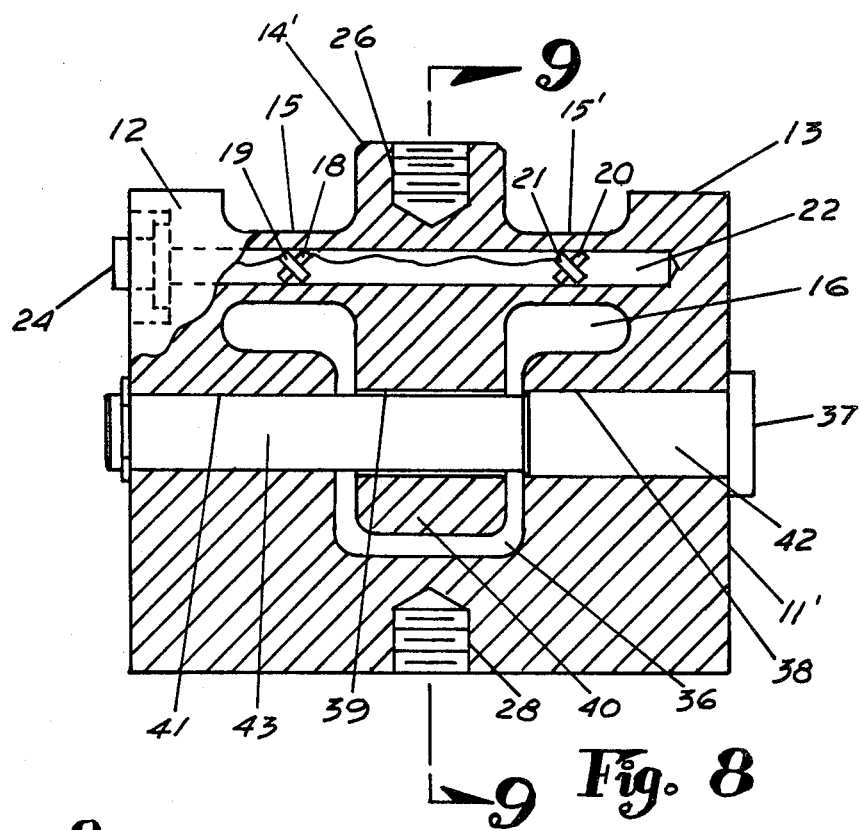
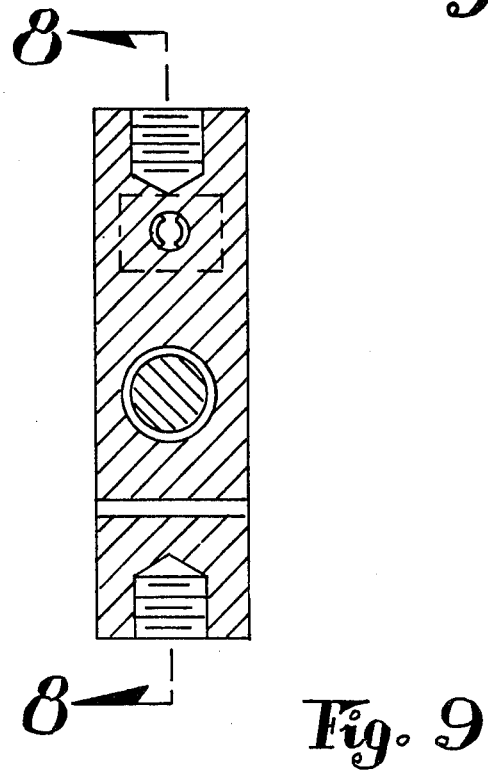
Fig. 8
Fig. 9

DOUBLE SHEAR BEAM STRAIN GAGE LOAD CELL

This application is a continuation of application Ser. No. 37,231, filed May 8, 1979, U.S. Pat. No. 4,283,941 entitled: DOUBLE SHEAR BEAM STRAIN GAGE LOAD CELL.

This invention relates to strain gage load cells and more specifically to a novel and improved double shear beam load cell which affords advantages of both the column and beam type load cells while at the same time avoiding the disadvantages of such cells.

Commonly used types of load cells are generally classified as the column type and the beam type. The column type load cell utilizes an axially stressed member having strain gages mounted therein. This type of cell is then interposed between the pair of axially aligned members and is arranged to measure tension or compression. While this type of cell has numerous advantages, the cell has poor lateral stability and is generally of relatively low strain sensitivity since the axial strains are small relative to the applied load.

Beam type load cells have relatively high strain sensitivity for a given load which is attained by selecting the appropriate cross sectional shape of the beam. Beam type load cells are particularly useful for the measurement of lighter loads and they afford greater lateral stability as they do not generally require additional lateral support as in the case of column type load cells. Beam type load cells however have the disadvantage in that the load is generally applied along one axis or line of action and is reacted along other axes or lines of action as for instance in the cantilever beam load cell as well as other simple beam load cell structures. As a result, beam type load cells are not particularly useful in applications in which the action and reaction loads are applied along the same axis.

One object of this invention resides in the provision of a novel and improved load cell which combines the advantages of both the column and beam types of cells and at the same time avoids many of their disadvantages.

Another object of the invention resides in the provision of a novel and improved load cell particularly advantageous for measuring axial loads, utilizing a double shear beam, which can be of unitary construction and wherein the strain gages can be positioned in a fully protected position and maintained free of moisture and other contaminents as well as mechanical damage.

Still another object of the invention resides in the provision of a novel and improved double shear load cell having a high degree of sensitivity for the measurement of relatively small forces.

Still another object of the invention resides in the provision of a novel and improved load cell embodying overload protection means to prevent damage to the cell in the event of overloads which can be costly as well as extremely hazardous.

The objects of this invention are attained through the utilization of a double shear beam load cell for the measurement of axial loads and fundamentally embodies a rigid U-shaped structure having a displaceable element position between the legs thereof and coupled to the legs by shear beams. Strain gages are carried by the beams and displacement of the movable structure relative to the U-shaped member will be sensed by the strain gages. Since dual shear beams are utilized, lateral support of the cell when measuring axial loads is not required and only the axial loads will be sensed by the strain gages.

The above and other objects and advantages of the invention will become more apparent from the following description and accompanying drawings forming part of this application.

Figure 1:
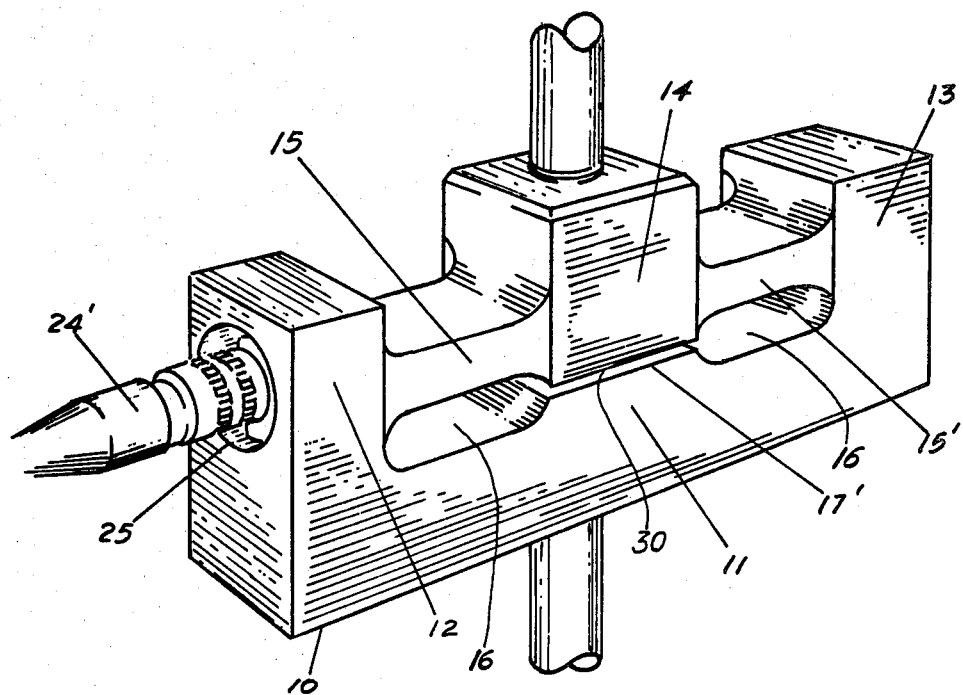
FIG. 1 is a perspective view of one embodiment of a double shear beam load cell in accordance with the invention.
Figure 2:
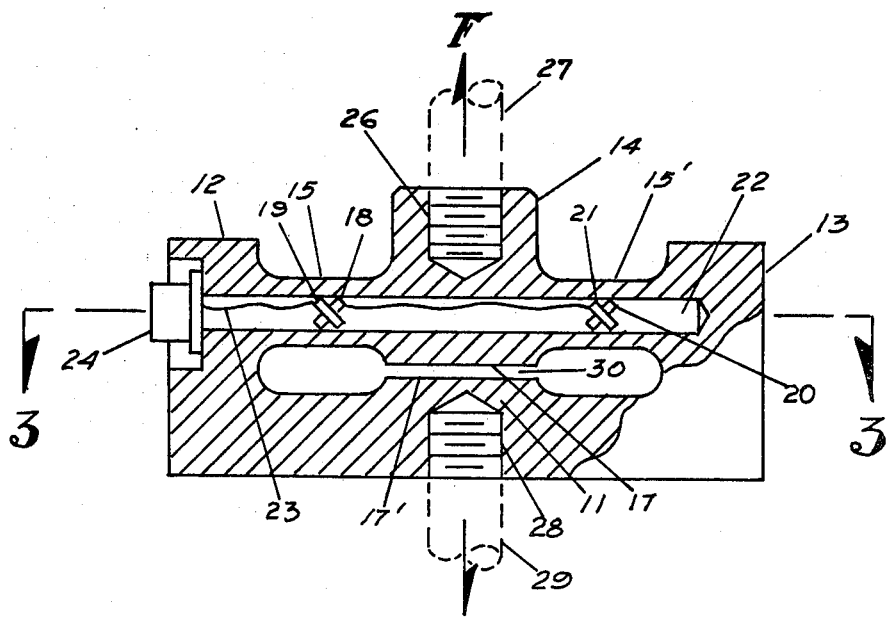
FIG. 2 is a cross sectional view of FIG. 1 taken along the line 2—2 thereof.
Figure 3:
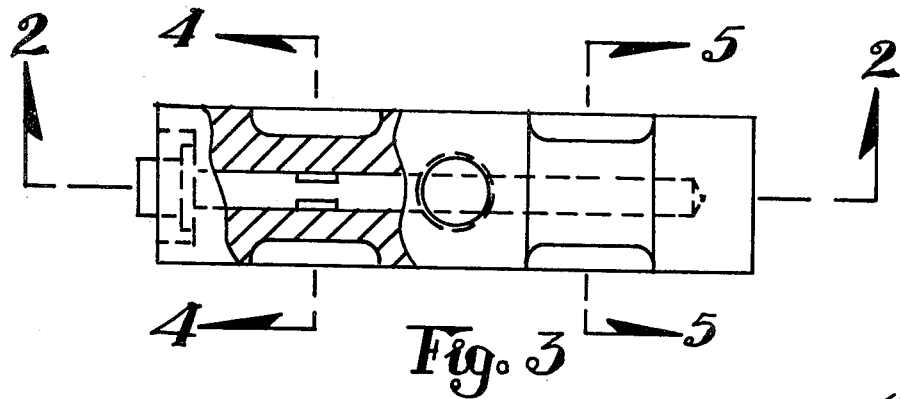
FIG. 3 is a cross sectional view of FIG. 2 taken along the line 3—3 thereof.
Figures 4, 5, 6:
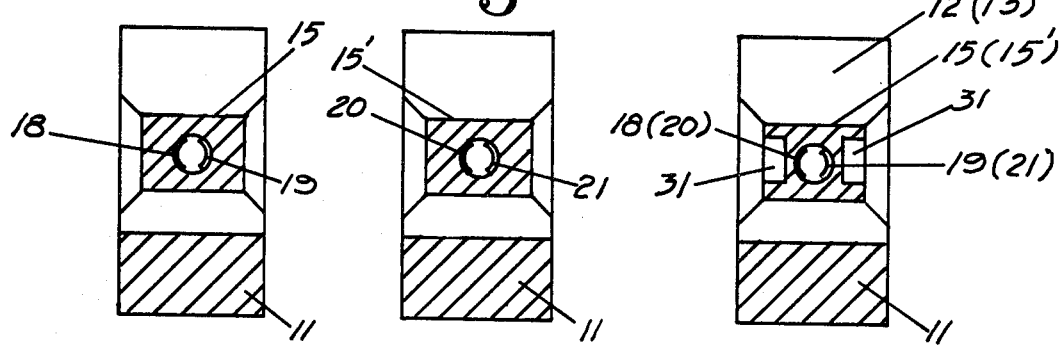
Figure 7:
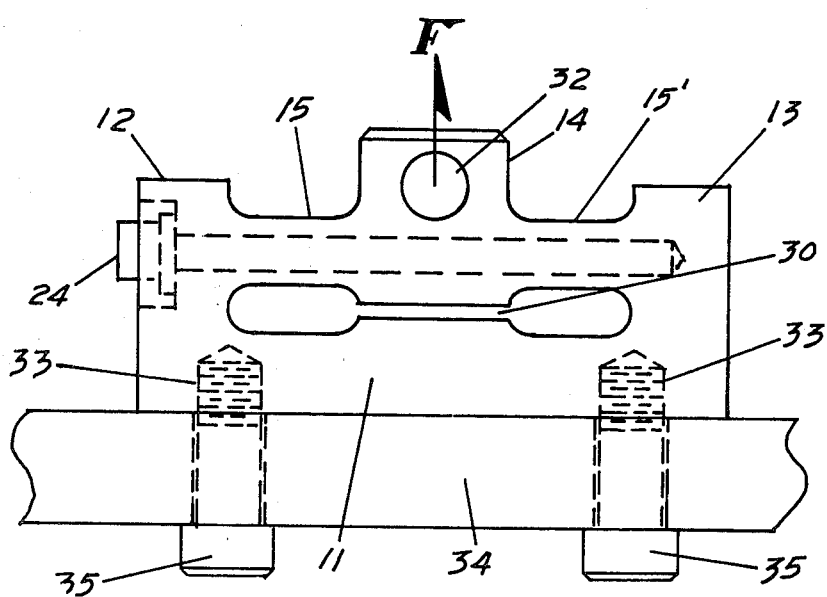

FIGS. 4 and 5 are cross sectional views of FIG. 3 taken along the lines 4—4 and 5—5 thereof;

FIG. 6 is a cross sectional view of FIG. 3, similar to FIGS. 4 and 5 and showing a modified form of the invention;

FIG. 7 is a side elevational view of the structure shown in FIG. 1 but having modified mounting means;

FIG. 8 is a cross sectional view of another modified embodiment of a double shear beam load cell similar to that illustrated in FIGS. 1 through 5 and taken along the line 8—8 of FIG. 7; and, FIG. 9 is a cross sectional view of FIG. 8 taken along the line 9—9 thereof.

Referring now to the drawings and more specifically to FIGS. 1 through 5, the novel and improved load cell in accordance with the invention is generally denoted by the numeral 10 and includes a generally U-shaped body having a base portion 11 and leg portions 12 and 13. A displaceable element 14 is positioned between the legs 12 and 13 and is coupled to the legs by shear beams 15 and 15'. In the normal position, the underside of the movable element 14 is positioned in spaced relationship to a raised platform 17' centrally disposed on the base member 11. In the instant embodiment of the invention, the shear beams 15 and 15' are formed by providing elongated slots 16 having a narrowed intermediate section 30. With this arrangement, it is evident that the entire structure may be formed of unitary construction by known milling and boring procedures though it is of course evident that other constructional procedures may be employed.

In the illustrated embodiment of the invention thus far described, four strain gages 18, 19, 20 and 21 are disposed within an opening 22 bored through the leg 12 of the U-shaped body 10 centrally through the beam 15, the movable member 14, the beam 15' and partially into the leg 13. The strain gages are secured to the wall of the opening 22 and positioned centrally of each beam 15 and 15'. The strain gages 18 and 19 are positioned at 90° one relative to the other and each gage is positioned with its sensing direction at 45° relative to the axis of the beam 15. The gages 20 and 21 are positioned relative to the beam 15' in the same manner as the gages 18 and 19. The gages are connected by multi-conductor cables 23 to a connector 24 disposed within a recess 25 in leg 12 of the U-shaped portion. The connector 24 is securely held in position to close the opening 22 and thus completely seal it to prevent the entrance of moisture or other contaminents. With this structure, the gages 18 through 21 are also in a protected position, though it is apparent that the gages could be mounted on the surfaces of the beams 15 and 15' if so desired and achieve essentially the same result except that the gages would not be protected against physical damage and protection against moisture and contaminents would be somewhat more difficult. A cooperating connector 24' having a cable attached thereto engages the connector 24 for coupling the strain gages to electrical circuitry for indicating shear force.

The electrical circuitry for use in cooperation with the strain gages 18 through 21 to produce the shear force measurements and thus the axial load is discussed in detail in U.S. Pat. No. 3,365,689 granted to Ali Umit Kutsay and therefore details of the circuitry are not deemed necessary.

In the instant embodiment of the invention, the element 14 of the load cell is provided with a threaded opening 26 to receive a threaded rod 27 while the base portion 11 also has a threaded opening 28 for receipt of a second threaded rod 29. The openings 26 and 28 are axially aligned and in normal operation, an unknown force F is applied to the rod 27 and a reaction force G is applied to the rod 29. These forces can either be in tension or compression and in the instant embodiment of the invention overload protection when measuring compressive forces can be attained by appropriately adjusting the width of the gap 30 between the upper face 17' of the transverse member 11 and the bottom face 17 of the movable element 14. Overload protection for both tensile and compressive stresses will be described in connection with the embodiment of the invention disclosed in FIGS. 8 and 9. In order to increase the sensitivity of the cell, openings 31 as shown in FIG. 6 may be bored in each side of the beams 15 and 15' in alignment with the cells 18 through 21 with the result that the strains will be concentrated in the areas of the cells and thus greatly increase the response of the cells to tensile and compressive forces.

A modified embodiment of the invention is illustrated in FIG. 7 and like numerals have been utilized to denote corresponding elements of the structures shown in FIG. 7 and in FIGS. 1 through 6. In this embodiment of the invention, the threaded openings 26 and 28 are omitted and in place thereof the movable element 14 is provided with a through opening 32 while the transverse base member 11 is provided with a pair of threaded openings 33 for securing the cell to a primary base member 34 by means of bolts 35 or other suitable fastening means. The through hole 32 permits application of a load F by means of a clevis pin and clevis not illustrated. It is therefore evident that the novel and improved load cell in accordance with the invention is extremely versatile and can be adapted to a variety of applications by merely providing appropriate attaching means while the basic configuration of the load cell remains the same.

The embodiment of the invention illustrated in FIGS. 8 and 9 is substantially identical to the previous embodiments of the invention except that overload protection is provided. In this embodiment of the invention, elements corresponding to those of FIGS. 1 through 5 are denoted by like numerals.

In this embodiment of the invention, the base member denoted herein by the numeral 11' is made substantially deeper than the base member 11 and a deep U-shaped slot generally denoted by the numeral 36 is provided which results in an elongated form of the movable element denoted herein by the numeral 14'. With this arrangement, the element 14' will be deflected under both compressive and tensile stress in the same manner as described in connection with the embodiment of the invention shown in FIGS. 1 through 5. In this embodiment of the invention, deflection of the shear beams 15 and 15' is limited by a shear pin 37. The shear pin 37 is installed by drilling co-axial openings 38 and 39 through one side of the base member 11' and through the lower portion 40 of the member 14'. A third coaxial opening 41 is then drilled through the remainder of the base member 11 and the diameter of the opening 41 is smaller than the diameter of the opening 39 to provide the desired limitation of the degree of deflection of the shear beams 15 and 15'. The shear pin has an enlarged portion 42 which will snuggly fit the opening portion 38 in the base member 11 and this portion of the pin will extend only to the slot 36. The remainder 43 of the pin is of a reduced diameter to snuggly fit the opening 41 thus leaving an annular gap between the pin and the wall of the opening 39. The openings 38, 39 and 41 are precisely machined so that they are parallel to the neutral axis of the shear beams 15 and 15'.

With the foregoing arrangement, it is evident that the element 14' will be deflected whether in tension or compression only until the wall of the opening 39 contacts the shear pin 37. At this point, the load will no longer be carried by the shear beams 15 and 15' but by the shear pin 32 which would be designed to withstand considerably higher loads than the shear beams 15 and 15'.

While the form of the invention illustrated in FIGS. 8 and 9 is provided with aligned axial openings 26 and 28 for measurement of axial loads, it is evident that these openings may be substituted by a pair of threaded openings such as the openings 33 as shown in FIG. 7 for securing the load cell to a primary base member and the opening 26 may be replaced by a through opening such as the opening 32 as shown in FIG. 7 for the attachment of a clevis pin as previously described.

While only certain embodiments of the invention have been illustrated and described, it is apparent that alterations, modifications and changes may be made without departing from the true scope and spirit thereof.

I claim:

1. A strain gage load cell of unitary construction for the measurement of axial loads and capable of substantially resisting lateral loads which adversely affect the measurement of axial loads comprising a relatively thick rectangular block of material, said block having a pair of recesses in one edge thereof, each of said recesses extending from a point spaced from one edge to a point spaced from the center and forming a central element of substantial area, said block further including a pair of elongated slots extending through said block at points spaced from the first said recesses and substantially parallel therewith and a narrow elongated slot connecting said pair of slots, the last said slots forming a discrete central element supported by substantially uniform elongated rectangular shear beams formed by said recesses and said pair of slots, said block further including a central opening extending through each of said shear beams, pairs of strain gages mounted within said opening in each shear beam and positioned centrally thereof, the gages of each pair being disposed at 90° one relative to the other and at 45° relative to the axis of the associated shear beam and means for applying an axial load to be measured between said central element and the opposing surface of said block.

* * * * *